(12) United States Patent
Walacavage et al.

(10) Patent No.: US 7,716,014 B2
(45) Date of Patent: May 11, 2010

(54) REUSE OF MANUFACTURING PROCESS DESIGN MODELS AS PART OF A DIAGNOSTIC SYSTEM

(75) Inventors: Joseph G. Walacavage, Ypsilanti, MI (US); James D. Coburn, Cleveland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 596 days.

(21) Appl. No.: 10/956,410

(22) Filed: Sep. 30, 2004

(65) Prior Publication Data

US 2006/0069541 A1    Mar. 30, 2006

(51) Int. Cl.
*G06F 11/30* (2006.01)
*G06F 7/00* (2006.01)
*G06F 19/00* (2006.01)
*G05B 13/02* (2006.01)
*G01M 17/00* (2006.01)
*G21C 17/00* (2006.01)

(52) U.S. Cl. .................. 702/183; 702/185; 700/30; 714/33; 714/37; 714/48; 701/29

(58) Field of Classification Search ........... 702/127, 702/182, 183, 185; 700/28–30, 177; 703/12–14, 703/17, 22; 714/100, 1, 25, 26, 32, 33, 37, 714/38, 48; 701/29, 33
See application file for complete search history.

(56) References Cited

U.S. PATENT DOCUMENTS

| | | | | |
|---|---|---|---|---|
| 4,578,747 A * | 3/1986 | Hideg et al. | ......... | 700/31 |
| 5,190,020 A * | 3/1993 | Cho | ......... | 123/684 |
| 5,384,698 A * | 1/1995 | Jelinek | ......... | 700/29 |
| 5,539,638 A * | 7/1996 | Keeler et al. | ......... | 701/29 |
| 5,544,639 A * | 8/1996 | Shouda et al. | ......... | 123/676 |
| 5,585,553 A * | 12/1996 | Schricker | ......... | 73/114.37 |
| 5,598,076 A * | 1/1997 | Neubauer et al. | ......... | 318/568.22 |
| 5,609,136 A * | 3/1997 | Tuken | ......... | 123/357 |
| 5,646,341 A * | 7/1997 | Schricker et al. | ......... | 73/114.57 |
| 5,859,964 A * | 1/1999 | Wang et al. | ......... | 714/48 |
| 5,862,513 A * | 1/1999 | Mezzatesta et al. | ......... | 702/9 |
| 5,921,313 A * | 7/1999 | Niemann et al. | ......... | 164/453 |
| 6,056,781 A * | 5/2000 | Wassick et al. | ......... | 703/12 |
| 6,085,143 A * | 7/2000 | Przymusinski et al. | ......... | 701/110 |
| 6,108,616 A * | 8/2000 | Borchers et al. | ......... | 702/183 |
| 6,216,048 B1 * | 4/2001 | Keeler et al. | ......... | 700/44 |
| 6,238,939 B1 * | 5/2001 | Wachs et al. | ......... | 438/14 |
| 6,442,441 B1 | 8/2002 | Walacavage et al. | ......... | 700/86 |
| 6,537,227 B2 * | 3/2003 | Kinnunen et al. | ......... | 600/500 |

(Continued)

FOREIGN PATENT DOCUMENTS

JP        60238791 A    * 11/1985

*Primary Examiner*—Crystal J Barnes-Bullock
(74) *Attorney, Agent, or Firm*—Schwegman Lundberg LLP; William R. Walbrun; John M. Miller (57) ABSTRACT

A method and apparatus that includes determining differences between a process model and an actual process are used as a diagnostic system for the actual process. The process model includes elements from a design process to provide a "known good" condition for evaluating the differences. Initial input states to the process model are the initial input states to the actual process. Output information correlated to states in the actual process is provided by controls, such as programmable logic controllers, that manage the actual process.

53 Claims, 3 Drawing Sheets

U.S. PATENT DOCUMENTS

| | | | |
|---|---|---|---|
| 6,766,232 B1 * | 7/2004 | Klausner | 701/33 |
| 6,862,514 B2 * | 3/2005 | Ehara | 701/102 |
| 6,928,361 B2 * | 8/2005 | Nakayama et al. | 701/104 |
| 7,120,559 B1 * | 10/2006 | Williams et al. | 702/185 |
| 7,209,799 B2 * | 4/2007 | Agapiou et al. | 700/177 |
| 7,216,006 B2 * | 5/2007 | Yasui et al. | 700/54 |
| 7,272,459 B2 * | 9/2007 | Kokotov et al. | 700/97 |
| 2007/0067678 A1 * | 3/2007 | Hosek et al. | 714/25 |

* cited by examiner

REUSE OF MANUFACTURING PROCESS DESIGN MODELS AS PART OF A DIAGNOSTIC SYSTEM

FIELD OF THE INVENTION

The present invention relates generally to diagnostic systems, and more particularly, to controller diagnostic systems.

BACKGROUND

Diagnostic procedures and systems in a manufacturing environment contribute to the uptime of a manufacturing process by reducing the mean time to repair (MTTR). In general, the basic mechanism of diagnostic systems involves comparing an actual state of a process with a desired state for the process at a particular point in time. The desired state may be a particular equipment configuration, a product configuration, a process or product behavior, a product time relation, or other possible states. Unfortunately, the amount of time needed to configure the desired behavior can greatly exceed the effort to develop the controls or control systems used on the plant floor during the implementation of the manufacturing process. This enormous effort to develop diagnostic methods and systems may stem from an attempt to capture all potential failure modes.

SUMMARY

The above mentioned problems are addressed by the present invention and will be understood by reading and studying the following specification. In various embodiments, methods and apparatus include determining differences between a process model and an actual process to diagnose the actual process. The process model includes elements reused from a design process to evaluate the differences. The input states to the process model are the input states to the actual process. Output information correlated to the actual process may be provided by a controller that regulates the actual process.

These and other aspects, embodiments, advantages, and features will become apparent from the following description and the referenced drawings.

DETAILED DESCRIPTION

In the following detailed description of the invention, reference is made to the accompanying drawings which form a part hereof, and in which are shown by way of illustration, specific embodiments in which the inventions may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

Figure 1:
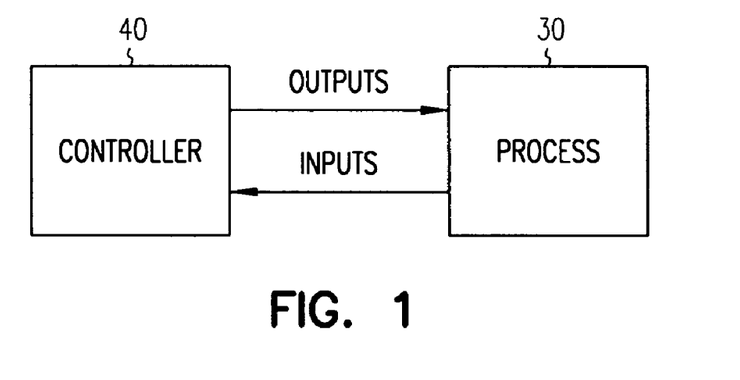
FIG. 1 illustrates a relationship between a process and a controller in an embodiment to generate a "known good" process model, according to the teachings of the present invention.

In an embodiment, a model of a process that is developed as part of the design phase in a manufacturing environment is reused to provide a diagnostic "known good" to evaluate the actual manufacturing process. A relationship between a process and a controller in an embodiment to generate a "known good" process model is illustrated in FIG. 1. Inputs to controller 40 from process 30 determine the current state of process 30. Outputs from controller 40 to process 30 command process 30 to change state. In the design phase, a process model should provide accurate and desired state information back to the controller, where the controller commands it to change state.

A "known good" may be taken to be those process states, procedures, or steps expected to provide a desired set of outputs for a specific set of inputs. For example, for a given state of a set of tools or elements of a process, control logic uses this state to determine the next state for these tools or elements. The given state is provided as input to the control logic and the next state is provided as output from the control logic. Additionally, such control logic may be used to manage a sequential process. The process model arising from the manufacturing design process has many of the process assumptions embedded in it from the design process. Further, in this embodiment, the model is reactive, rather than prescriptive, and will more closely adapt to many of the out-of-control conditions likely to be encountered on the plant floor for a manufacturing process.

The diagnostic system is based on implementing a "known good" process model with data and logic reused from modeling and/or testing during the design phase. In an embodiment, a model, by definition, has all the connection points to multiple control systems embedded in it, physically or virtually. A "known good" process model may be hosted on a computer with a high speed link to the various controllers of an actual manufacturing process in order to monitor the behavior of the actual process, as viewed by these various controllers. Alternatively, the process model may be realized as code that may execute in these controllers. Though it may be more cost effective to run the process model in a computer, for maintenance reasons it may be desirable to use direct control hardware for the process model. In an embodiment, the diagnostic system includes, in addition to the process model, a difference engine that compares real-time states of the actual process to the states of the "known good" process model. The diagnostic system may also include an annunciation device that alerts an operator to fault information and/or possible remedies. In an embodiment, the diagnostic system and process includes an analysis unit, or mechanism, that monitors changes in the mechanics of the process so that the process model is consistent with the actual process.

Figure 2:
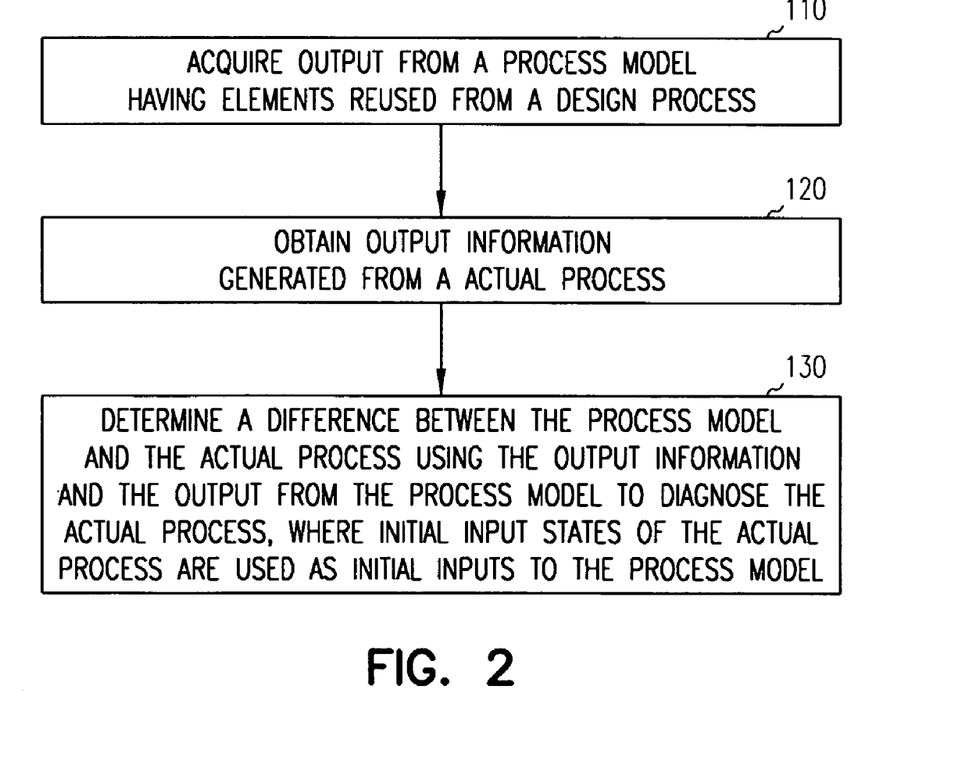
FIG. 2 depicts a flow diagram of an embodiment of a method to diagnose an actual process using a process model having elements derived from a design process, according to the teachings of the present invention.

FIG. 2 depicts a flow diagram of an embodiment of a method to diagnose an actual process using a process model having elements derived from a design process. A process model includes rules and logic to emulate an actual process to which the process model is correlated to provide a set of outputs from a set of inputs according to the logic model for the actual process. An initial input to the process model may represent an initial or a default state of an actual process to be used by the process model. The logic of the process model determines an expected state, and the process model may provide this expected state as an output to another system unit. Also, the process logic may use this next state as input to itself to determine a subsequent expected state of the actual process, according to its embedded rules. The process model may include a format for providing the set of inputs and the set of outputs. The process model may be implemented in software with initial input data provided as signals that represent a given state of the actual process and the output data provided as signals that represent an expected state of the actual process at a given time in response to subsequent processing initiated by the initial input signals. The input data and/or the output data associated with the software based process model may be provided as data tables. Alternately, the process model may be implemented by logical circuits and hardware to emulate the response of the actual process to input initial data provided as signals that represent a given state of the actual process and to provide output data as signals that represent an expected state of the actual process at a given time in response to subsequent processing initiated by the input signals.

In FIG. 2, at 110, the method of this embodiment includes acquiring output from a process model having elements reused from a design process. The output may represent the current expected state of an actual process as determined by the process model. This output to another system unit is also subsequently used as input to the process model, though it may be formatted differently for communication external to the process model.

In the design process, design data is generated to provide tools for a manufacturing process. The design data may include information regarding the relationship between various components of the manufacturing process such as, but not limited to, physical orientation and time/process relationships. The design process may include specifying a "known good" model for one of several processes to be implemented in the manufacturing process. For example, the tools and procedures for applying these tools to one line in a manufacturing process integrating several lines of activity may be designed and tested outside the targeted manufacturing environment. The results of the testing of the design are incorporated into the design process to provide a representation of the tools and procedures to use the tools in the process line that is known from prior testing to be a good representation. When the tools are integrated into the manufacturing process as one of several lines, the elements of the design process that were specified and verified in the use of these tools in the test line are reused in the process model. Elements from the design process from the other lines integrated in the manufacturing process may also be reused in the process model. In an embodiment, a process model is provided with elements from component design processes, where the elements have been determined to provide a "known good" representation for its particular component design process.

At 120, the method of the embodiment of FIG. 2 includes obtaining output information correlated to an actual process. The actual process may include a manufacturing process that integrates processing from a number of manufacturing lines. Each manufacturing line may provide a product that is incorporated and/or used with other manufacturing lines in the overall manufacturing process. The actual process may include monitoring each manufacturing line process and providing signals that represent the status of the manufacturing line. Such monitoring and signaling may also include conducting these activities for a number of material, part, and/or tool positions, for connections in the line, and for process states within a manufacturing line. Each manufacturing line may be managed, which includes being regulated, by a controller that can provide output information correlated to the actual status of the manufacturing process line and its underlying components, both work piece components and tools. In various embodiments, a programmable logic controller (PLC), such as PLCs known by those skilled in the art, may be adapted to function as a controller to generate output information regarding an actual process.

At 130, the method of the embodiment of FIG. 2 includes determining a difference between the process model and the actual process using the output information correlated to the actual process and the output from the process model to diagnose the actual process, where initial input states of the actual process are used as initial inputs to the process model. In an embodiment, the output information is compared with the output from the process model. This output information may represent a current state of the actual process and the output from the process model may represent an expected state of the actual process. In an embodiment, an output table generated from the actual process is compared with an output table generated from the process model, where each output table contains results from processing input from its corresponding input table. The two input tables are provided with common conditions for the initial input states. The output table from the actual process may be an input image table that identifies the current input signals or states to the tools or elements of the actual process. The output table from the process model may be an input image table that identifies the currently expected input signals or states to the tools or elements of the actual process.

In an embodiment, the input states are scanned into the process model at one or more scan rates. As the logic of the process model operates over time, it provides itself at its scan rate with the expected inputs to its virtual tools or elements representing the tools or elements of the actual process. This scan rate may be coordinated with periodic changes in the input states to the actual process. In an embodiment, the input states are scanned into the process model rapidly enough such that aperiodic events are captured. This aperiodic input procedure allows the process model to respond to arbitrary inputs correlated to random or sporadic inputs to the actual process. Initial input states derived from the actual process may be generated for the process model for abrupt changes in the input states to the elements of the actual process. Alternately, the logic or rules of the process model may include these abrupt changes and use only a beginning initial input state of the elements of the actual process to interpolate the expected behaviour.

After determining a difference between the output of the process model and the output information from the actual process, this difference may be provided to operators on the manufacturing line, operators at monitoring positions, monitoring systems on the manufacturing line, monitoring systems at a central monitoring location, and other systems associated with monitoring and diagnostic tasks. The annunciation process may also include activating lights and/or sound producing apparatus. In an embodiment, after determining a difference between the output of the process model and the output information from the actual process, information associated with this difference may be logged into a database. The database may be realized in various formats including electronic memory storage devices. This information may be used to analyze the relationship between the process model and the actual process, such as reviewing historical data associated with the specific differences being analyzed. In some cases, the analysis may lead to verification that the actual process has evolved and that the process model may need to evolve. In such cases, to evolve the process model, the analysis process would provide an indication such as a signal or other form of data to reinitiate the design process based on the differences between the process model and the actual process.

In various embodiments, variations of the method of FIG. 2 may be realized using a system such as a computer or other electronic device that executes computer-executable instructions for performing these methods. The computer-executable instructions may be provided using any form of computer readable medium. In an embodiment, the computer-executable instructions may include logic from the design process or design processes that are elements of the process model. The computer-executable instructions include logic to use the output from performing the process model instructions along with output information correlated to the actual process to diagnose the actual process. The output information may be obtained through communication of the system with one or more controllers that manage, which includes regulating, the actual process. In diagnosing the actual process, the system determines the difference between the process model and the actual process using the output information and the output from the process model, where initial input states of the actual process are used as initial inputs to the process model. The output information of the actual process may include a current status of elements operating in the actual process and the output from the process model may include a currently expected status of elements operating in the actual process. Such a computer based system may control scanning of the input states in the process model.

The computer executable instructions may include instructions that execute the control logic of the process model. The computer executable instructions may also include instructions for announcing the difference between the process model and the actual process, instructions for logging information associated with the difference between the process model and the actual process, and instructions for analyzing the difference between the process model and the actual process. The computer executable instructions may also include logic that allows for the generation of a signal or data output to initiate a reconsideration of one or more design process directed to the evolvement of the process model based on analyzing the difference between the process model and the actual process.

Figure 3:
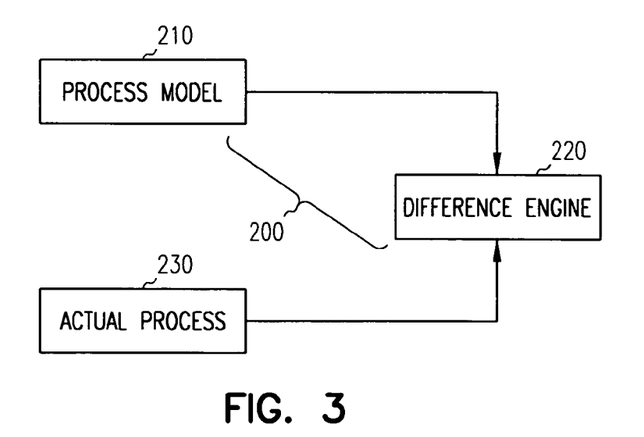
FIG. 3 depicts a block diagram of an embodiment of an apparatus having a process model and a difference engine to diagnose the actual process associated with the process model, according to the teachings of the present invention.

FIG. 3 depicts an embodiment of an apparatus 200 having a process model 210 and a difference engine 220 to diagnose an actual process 230 associated with process model 210. Process model 210 includes a unit that has logic to virtually perform the tasks of the actual process to which it is associated. The logic unit may be realized as hardware with logic circuitry to perform these tasks. Alternately, the logic unit may be realized as software that is programmable to perform these tasks, such as the logic unit being part of a computer or controller such as a programmable logic controller. Other embodiments include combination of hardware logic circuitry and programmable software. Process model 210 may include a number of component process models, where these component process models are adapted to represent an integration of a number of component actual processes. Process model 210 may also include a mechanism for receiving inputs, or input states, and a mechanism for providing outputs to other system units. In an embodiment, process model 210 has physical connections to receive input signals from components of the actual process, a multiplexed signal from one or more communication units that collect signals that are inputs to the actual process, a table of input status that represent the initial inputs to the elements of the actual process from a controller that manages the actual process.

In an embodiment, difference engine 220 may include means to diagnose actual process 230 that uses output from process model 210 and output information correlated to actual process 230. Both the output from process model 210 and output information on actual process 230 may be responsive to process model 210 and actual process 230 performing tasks having effectively received the same initial input states. Difference engine 220 may be adapted to compare the differences between the outputs from process model 210 and the output information correlated to actual process 230. The output information correlated to actual process 230 may be provided by a controller that regulates actual process 230. Difference engine 220 may receive output information from a number of controllers used to manage, which includes regulating, portions of the actual process. Additionally, the number of controllers may be in a one-to-one relationship with a number of component process models that make up process model 210. The transmission of the output information to difference engine 220 may be accomplished using a variety of communication devices and procedures as is known to one skilled in the art. Alternately, dependent on the application, process model 210 and difference engine 220 may be incorporated in a controller, or controllers, that manages, actual process 230.

Difference engine 220 may be adapted to announce, that is, provide an indication that a difference between the process model and the actual process has occurred. This annunciation or indication may be provided as a visible signal, an audible signal, or a combination of visible and audible signal. Difference engine 220 may be adapted to log information regarding the occurrence of the difference, where the logged information can be used with historical data to analyze these differences. The difference log for the associated information may be realized in any form of database that is known to those skilled in the art.

Figure 4:
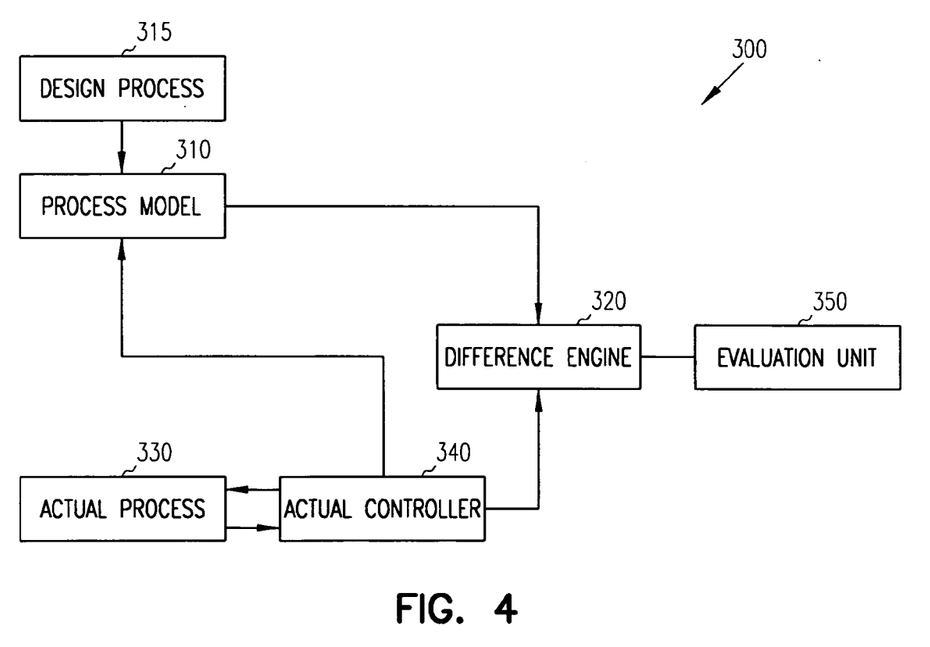
FIG. 4 depicts a block diagram of an embodiment of a system having a process model including elements from a design process, a controller, and a difference engine to diagnose the actual process associated with the process model, according to the teachings of the present invention.

FIG. 4 depicts a block diagram of an embodiment of a system 300 having a process model 310 including elements from a design process 315, a controller 340, and a difference engine 320 to diagnose an actual process 330 associated with process 310 model. Process model 310 may be an integration of a number of component process models corresponding to component processes of actual process 330. Each component process model includes elements from the design process for its associated component process of actual process 330.

An actual process may be made up of a number of component processes in which the manufacturing elements have been provided by one or more sources. In a test environment during the design process for these manufacturing elements (tools and procedures for using these tools), these manufacturing elements have been tested and verified as to their application to the actual process. Elements of the design process are incorporated into process model 310 as a "known good." With the integration of various component processes into actual process 330, the reuse of the design process with incorporation into process model 310 provides a diagnostic system for incorporation of these various manufacturing elements into actual process 330. Such a diagnostic system and methods provide for a reduction in the development effort normally associated with attempting to capture all possible failure modes.

Embodiments for process model 310 may be configured similar to process model 210 of FIG. 3. Process model 310 includes a unit that has logic to virtually perform the tasks of the actual process to which it is associated. The logic unit may be realized has hardware with logic circuitry to perform these tasks. Alternately, the logic unit may be realized as software that is programmable to perform these tasks, such as the logic unit being part of a computer or controller such as a programmable logic controller. Other embodiments include combination of hardware logic circuitry and programmable software. Process model 310 may include a number of component process models, where these component process models are adapted to represent an integration of a number of component actual processes.

Process model 310 may also include a mechanism for receiving inputs, or input states, and a mechanism for providing outputs, or output states, to other elements of system 300. In an embodiment, process model 310 has physical connections to receive input signals from components of the actual process, a multiplexed signal from one or more communication units that collect signals that are inputs to the actual process, or a table of input status that represent the inputs to the actual process from controller 340. These input signals, information, or input states are used by process model 310 as initial input to virtually determine the course of action for process model 310, which may include generating virtual control signals for elements within process model 310. These inputs may be scanned into process model 310 on practically a continuous basis, at period intervals, or rapidly enough such that aperiodic events are captured, depending on actual process 330. The state of process model 310 upon virtually performing tasks in response to receiving initial input or generating subsequent input may be provided as output to difference engine 320.

Controller 340 is an actual controller 340 that is adapted to manage, which includes regulating, tasks of actual process 330. Actual controller 340 may be a computer or a programmable logic controller as is known to those skilled in the art, where actual controller 340 is adapted to interact with difference engine 320 according to various embodiments dependent upon the application. System 300 may include a number of controllers interacting with difference engine 320. In an embodiment, the number of controllers that manage the actual process are in a one-to-one relationship with a number of component process models associated with a number of component processes of actual process 330.

Actual controller 340 may receive input signals, information, or input states from elements of actual process 330, from another related actual process, from a central control, and/or other input mechanism dependent upon the application. Such information may include a collection of facts or data representing specific events or situations that has been provided in electronic form in any number of conventional approaches. A signal may provide information by means of an indicator such as an impulse or a fluctuating electric quantity, such as voltage, current, or electric field strength. Variations in such a physical indicator may represent coded information. These inputs may provide a representation of the state in which actual process 330 is configured in its process that can be conveyed to difference engine 320. Actual controller 340 may provide these inputs to process model 310. Alternately, elements of actual process 330 or other input mechanism may provide the input to process model 310. Actual controller 340 uses these input signals, information, or input states to determine the course of action for actual process 330 and generates control signals for elements of actual process 330. These control signals may also provide a representation of the state in which actual process 330 is configured at a given time for use by difference engine 320.

Difference engine 320 is used to evaluate or diagnose actual process 330 using outputs from process model 310 and output information correlated to actual process 330 from actual controller 340. In an embodiment, difference engine 320 compares the outputs from process model 310 with output information from actual controller 340 to determine a difference exists between process model 310 and actual process 330 to diagnose actual process 330. The initial input states to actual process 330 used by controller 330 are used as initial input states to process model 310. Difference engine 320 may be adapted to receive signals and/or information from a number of controllers. Difference engine 320 may be adapted to receive signals and/or information from a number of process models. In an embodiment in which process model 310 has a number of component process models associated with multiple component processes of actual process 330, each having a separate controller, difference engine 320 is adapted to respond to the integrated actual process 330 and to each component process of actual process 330 in an independent manner according to parameters of a given application.

System 300 may also include an evaluation unit 350. In an embodiment, evaluation unit 350 is coupled to difference engine 320 and includes an annunciator to signal an occurrence of a difference between process model 310 and actual process 330. The form of the annunciator may be as a unit that provides a visual signal, an audible signal, a combination of visual and audible signal, or data provider such as but not limited to a computer, a printer, or other form of data communication device. Evaluation unit 350 may be coupled to difference engine and adapted as a log to collect information associated with the difference between the process model and the actual process. Evaluation unit 350 may also be configured as an analysis unit having historical information regarding the actual process. An analysis can be performed using logged information from current running of actual process 330 and process model 310 with respect to historical information regarding the same set of elements of actual process 330 performing similar activities in a similar time frame of the process.

In an embodiment, system 300 may include a computer in which process model 310, difference engine 320, and evaluation unit 350 are incorporated. Interaction among these computer components may be realized as messages within a diagnostic program. Actual controller 340 may also be realized as a computer based system. Actual controller 340 may be realized as a programmable logic controller as is known to those skilled in the art, where actual controller 340 is adapted to interact with difference engine 320 according to various embodiments. A number of controllers may be utilized in system 300. Alternately, process model 310 and difference engine 320 may be incorporated into actual controller 340 as programmable code or logic circuitry. Evaluation unit 350 may also be incorporated in actual controller 340. In an embodiment, system 300 has a number of controllers 340, where each controller has one or more of process model 310, difference engine 320, and evaluation unit 350 incorporated within the controller associated with the particular component process managed by that controller according to the given application.

In an embodiment, system 300 is a manufacturing plant having a number of manufacturing lines. Manufacturing plant 300 may include actual process 330 as a single process or actual process 330 having a number of component processes. Each component process may be correlated to one manufacturing line. Associated with each component process is a actual controller 340 and a process model 310 providing output to a difference engine 320 that may be configured as one difference engine 320 to interact with all controllers 340 and process models 310 or as multiple difference engines with each difference engine associated with one of several controllers 340. Alternately, one difference engine 320 in a set of difference engines 320 may be configured to interact with any number of controllers. The process models 310, difference engines 320, and evaluation units 350 may be incorporated in one or more computers in manufacturing plant 300 with annunciators providing visual and/or audible alerts exterior to each computer. Alternately, each process models 310, difference engines 320, and evaluation unit 350 may be incorporated in its associated actual controller 340 with annunciators providing visual and/or audible alerts exterior to each actual controller 340. Each process model 310 of manufacturing plant 300 includes elements reused from a design process correlated to its associated component process of actual process 330.

In an embodiment, a manufacturing plant may include a number of manufacturing lines configured as cells. For example, an automotive manufacturing plant may have various lines that are areas of a body shop plant associated with different areas of the vehicle body. These areas may include an underbody line, a body side line, a framing line, and lines that act as marriage stations so that body pieces are brought together in different levels of assembly until at the end of the line a product such as a sheet metal shell is provided. This product may be a component part for a next process in the overall vehicle production. As can be appreciated by one skilled in the art, the various embodiments discussed herein are not limited to an automotive manufacturing environment but may be applied to various manufacturing processes.

When a new or modified product is to be produced in the manufacturing plant, a redesign of the product requires a redesign of the tools and procedures in a manufacturing cell. Typically, the process redesign may require building a new set of tools. In an auto plant, as an example, this may involve redesign of the tools that hold parts together, tools that are used to work in concert the holding tools, flexible automation tools like robots for fastening and welding, and material handling systems. The redesigning includes a redesign of the control logic that manages theses tools. This control logic instructs the tooling how and when to work. The logic is hooked through a controller such as a programmable logic controller (PLC), which is a hardware controller that maintains the control logic. The PLC may be wired to sensors and actuators. The sensors sense whether particular product data is correct or a piece of product is present in a particular place in the cell to determine the status of the equipment in the cell. The sensor inputs to the PLC may also include people location as well as product location and safety information. The PLC uses signals input from the sensors to determine the course of action to be followed in the manufacturing process and outputs signals to actuators to conduct the appropriate action. Once the PLC determines from sensor information that the parts are safely in place (such as clamps properly closed or open at the proper time), its logic processes lead to sending a command to an element of the cell. For example, the PLC may send an instruction to the material handling robot to perform a designated function. When the function is completed, the PLC will receive a signal from the cell element indicating the completion. Typically, the PLC will continue performing sequential logic based on the input signals from sensors and actuators. In an embodiment, the PLC may operate in a parallel fashion. Operation of the PLC is not limited to sequential activity.

The programmable logic controller may include a number of separate PLC files. Some files may be associated with processing the tools and other files may be associated with safety. Another file may be associated with monitoring diagnostic logic that is responsible for determining that configurations in a cell are not correct and/or reporting such a condition to an operator, an alert system or process, and/or overall control system monitor. The diagnostics pieces of the logic are responsible for providing information that something has happened in the cell that is not right or not expected.

These diagnostic pieces may be provided as the cells are redesigned for new products or modifications to existing product. The tools and procedures for using the tools may be designed and tested in a testing environment that is a full scale implementation of the tools as they will be used in the manufacturing line. The procedures for these tools include the function-time relation associated with the manufacturing process of the particular line. Once the testing provides verification that the tools and procedures operate correctly in the full scale test environment, these tools and procedures can be moved into the production line of the actual process with the fabrication procedures incorporated as logic in various PLCs. Such a method of providing tools and procedures finds application in a manufacturing plant where the equipment for various lines or portions of lines are provided by vendors other than the manufacturer.

In various embodiments, elements of the design process are incorporated in a process model that is in a diagnostic system or diagnostic portion of a system. The diagnostics may deal with determining whether the redesigned tools performed all the functions intended, whether there are colliding functions in what should be a sequential operation, whether the tools operate together in expected time intervals, whether the newly tooled cell provides the expected throughput, and other such matters. Additionally, the integration of tools fully, but separately verified provides another set of items for the diagnostic process. With the individual tools or sets of tools and procedures verified in the full scale testing, elements of the design process are incorporated in a process model that may be implemented similar to a virtual controller such as a virtual PLC.

In the design process, a model is built to simulate and test the actual process. The tools of the actual process are defined in the model according to a set of logic instructions or logic file that generates a set of outputs depending upon a set of inputs. In the model the tools are provided with virtual connections to each other mapped to the actual process. The model may have electronic input connections allowing the model as a virtual controller to basically monitor the input states in the actual process and update the progress through the sequential logic of the model with each input.

Part of executing a controller simulation includes dealing with the accuracy in replicating what activities and function occur on the plant floor. In a virtual controller simulation process, scans are performed, where an input image table and an output image table identical to the same setups that are used on the plant floor are generated. An input image table (or tables) provides a representation of the input state of the manufacturing line being simulated. This input image table may be considered as a memory that is flipping bits either high or low stating whatever the current condition is relative to a particular position represented by the input state. An output image table (or tables) restates the messages, responses, or instructions that are being sent out by the controller to the virtual elements of the manufacturing line.

The virtual controller may be operated at a particular scan rate. It may operate at about 100 milliseconds, about 10 milliseconds, or whatever rate is set a particular operation. Whatever that scan rate is, the controller may initially scan its input image table to determine the state of conditions for those manufacturing elements to which it is assigned management responsibility. Based on reading the input image table, the controller proceeds through its ladder logic and updates all the instructions in its ladder logic file that are correlated to the input images. The controller cycles through its logic procedures such that based upon the new conditions in the input image table, including a lack of changes to a state, it processes all the steps, which can be visualized as rungs in a ladder, in its ladder logic file and then calculates and represents what the output should be based upon these new inputs. The controller will update its output image table. Based upon the output image table, it sends out the correct or required changes of instruction or permissions to the virtual tooling for which it manages. The controller may also perform a clean up cycle with respect to the input and output data. The controller may be configured to run in a cycle: read input states from the input image table, process control logic, update the output image table, and transmit the instructions generated by processing the control logic. The cycle continues with performing the read function to initiate the procedures. In operating the virtual controller, the system may be configured to constantly update its input image tables and update its output image tables in the virtual controller.

The model may use clock slaving technology that is known to those skilled in the art. Implementation of clock slaving technology or other clocking technology is provided to allow for synchronization in the model and with the inputs from the actual process. This allows for the representation of activity in the physical world of the actual process as much as possible in the virtual controller world of the model to the point where debug of the system or manufacturing line can be performed.

In an embodiment, the model provides a virtual controller world that represents the tooling and its interaction with the control logic of the physical production line controller. The model may be used to debug the tools to find software bugs, problems with control logic, and timing problems in the production sequence. The logic can be corrected and a simulation run. The results of the simulation may lead to changes in the mechanical design or layout of the cell.

At the end of this design process including building process definitions and logic relations and testing them through simulation of the actual process to be performed with the integration of the various tools, a process model is provided that may be considered as a "known good." By incorporating elements of the design process in the process model, a good confidence level regarding the virtual controller process model that is representative of the actual intended behaviour of the tools to be achieved in the production line can be reached. The diagnostic system uses this "known good" process model to compare a difference between the known state of the actual process and the expected or intended state of the process model.

The process model built using controller logic includes the data that was tested and verified in building the virtual controller logic with actually design data. The process model with the design data verified through a try out phase provides a "known good" model. The process model is provided with electronic connections to perform a read task with a controller that manages the physical tasks for a particular manufacturing line on the plant floor. In some instances, this physical controller may manage all tasks of all lines on the plant floor. However, the process model does not provide control output directed to the physical elements of the actual process in the manufacturing lines on the plant floor.

Synchronization is established initially between the process model states and the tooling states of the actual process. The states in the input image table are synchronized with the actual tooling to provide a similar starting point to compare a difference between outputs generated by the process model and states of the actual process at different points in time during the manufacturing processes of the actual process. The process model exercises the conditions presented to it by the input image table as it is updated. The inputs are presented by the physical tooling, though the presentation may be provided by other elements such as by the actual process controller managing the physical tooling. The process model then executes the model parameters that were generated in the design process producing a set of outputs that should represent a "known good" of what should be happening in the actual process, since these outputs are provided by the "known good" model. Then a comparison of these outputs from the process model with the corresponding view of the state of the actual process provides data for diagnosing the actual process.

In the diagnostic process, the process model is running as a virtual controller in parallel with running the physical controller that manages the functioning of the elements in the actual process. The process model may be viewed as running a virtual controller simulation, a soft controller, as the physical controller manages the actual process. The process model acting as a virtual controller may be realized as a controller provided in software. However, the initial inputs to the process model are not provided from simulated tooling, it is read through an input image table that is actually provided by the physical tooling states. In alternate embodiment, a portion or all of the input to the process model may be from a simulation process.

With a diagnostic system having an embodiment of the process model to compare differences of the process model with the actual process, using initial input from the actual process allows a diagnostic system to evaluate patterns in the actual process. Such a diagnostic system may compare an input image tables from the actual process and the process model using an embodiment of a difference engine. Looking for patterns concerns evaluating more than one data point, especially when dealing with a random or sporadic event that may occur once over a period of time. This period of time may include several production cycles in a manufacturing line such that its occurrence may happen for one of several products produced in the line. Pattern analysis may determine whether this is abnormal for a line producing one product type or is associated with one product in a manufacturing line that produces several product types.

The process model reuses the entire "known good" process model definitions developed in the design process to execute a particular slice or step of logic based upon the set of inputs read into the process model. With respect to interaction with the actual process, the process model is in a sort of a read-only cycle that generates an output image table. In parallel, the physical controller may be updating its output image table based upon the same set of initial inputs read by the process model. The logic of the physical controller may also result in a procedure to produce a set of inputs to the actual process that correspondingly produce new input to the input image table for the process model. With the process model and the physical controller performing logic correlated to running the actual process, two sets of output tables are created for comparison to determine whether there is anything different between the output table of what the manufacturing line in the plant is doing versus what is expected to be occurring in the "known good" model. These output tables may be an input image table of the actual process and an input image table of the process model. This may be performed in a cyclic process where new inputs to the actual process occur.

The difference in the two outputs may indicate a problem in the actual process. For example, the process model may receive an input from a sensor indicating a clamp is open with a piece of sheet metal at the sensor location and then later in time receive an new input from the same sensor indicating that the clamp is closed that is holding the sheet metal to a fixture for welding. From design data supplied in a tool tryout phase or from past experience, the difference in time between these new inputs should be a particular value. The outputs correlated to the actual process show that the difference in time between the inputs is greater than the expected value in the process model. A debug to the actual process can be initiated to determine the cause of the additional delay in closing the clamp. This is an example of the application of an embodiment of the diagnostic to a cycle time problem. Embodiments for the diagnostic system may be used to evaluate integration issues. Integration issues may include constructing the manufacturing cell with tools from several vendors in which each set of tools has been produced through a design process that includes trying out the particular tooling individually. The process model is provided with the data reused from each of the design processes together with the logic to integrate these tools on the plant floor. The use of the process model allows the diagnostic process to be conducted in an effective and efficient manner.

Differences generated in the comparison between outputs from the process model and outputs correlated to the actual process can be provided as messages to an individual or system to communicate or announce the occurrence of these differences. Such a message may indicate that the actual process or component processes should be simulated offline from the production platform to which the process model is connected in a read only configuration, to increase the throughput of the actual process. The message indicating the occurrence in these differences may be logged to provide historical lessons saved there over time that indicate whenever a particular difference occurs. Historical data saved in such a manner may be used to further diagnose the overall manufacturing system including the performance versus age relationship of the tools of the system.

In the case that the comparison yields signification differences, the diagnostic system may provide a signal or indication to evaluate or reinitiate the design process for one or more component processes associated with the actual process. The process model may need to be updated, though through the design process, the process model was developed as a "known good" or an expected good. At some point, parameters in the actual process may need to be re-evaluated to insure that the process model provides the "known good" model.

Figure 5:
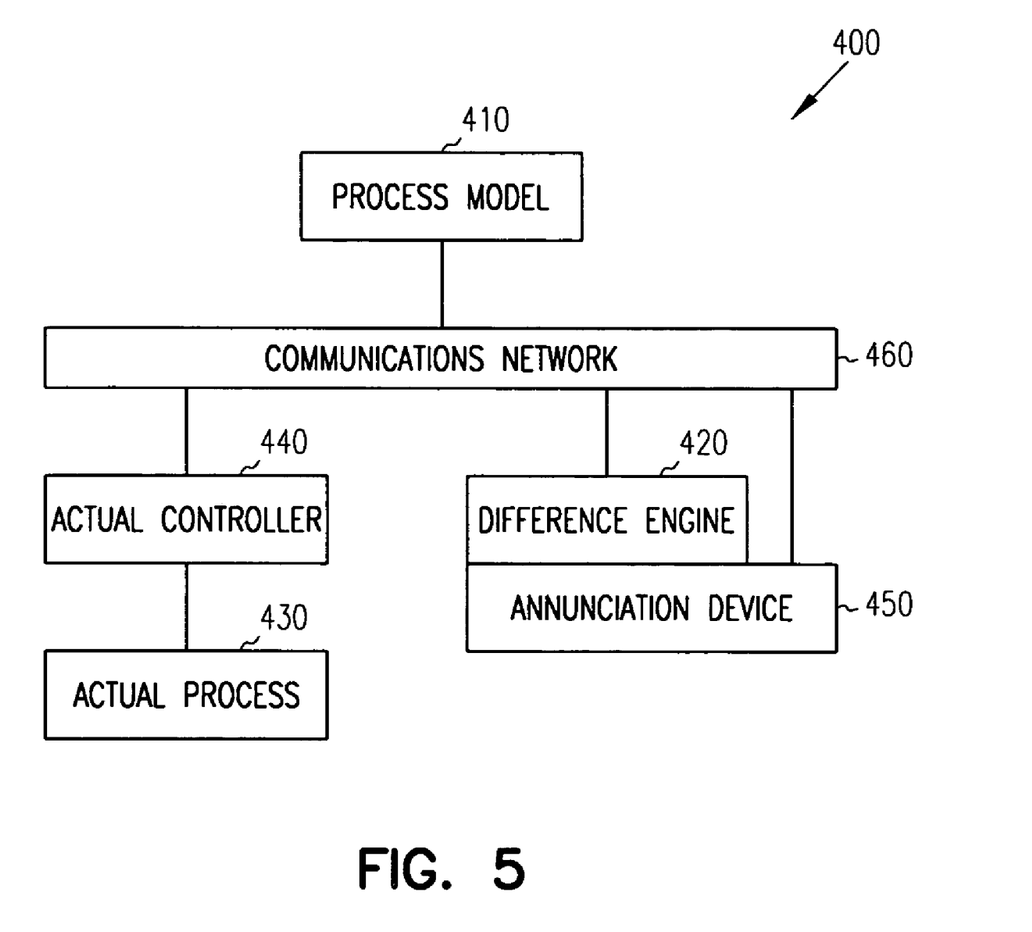
FIG. 5 depicts a block diagram of another embodiment of a system having a process model including elements from a design process, a controller, and a difference engine to diagnose the actual process associated with the process model, according to the teachings of the present invention.

FIG. 5 depicts a block diagram of another embodiment of a system 400 having a process model 410 including elements from a design process, an actual controller 440, and a difference engine 420 to diagnose an actual process 430 associated with the process model 410. Actual controller 440 manages actual process 430, while process model 410 acts as a virtual controller correlated to actual process 430. Difference engine 420 may include an annunciation device 450 or be connected to annunciation device 450. System 400 includes a communication network 460 to which process model 410, difference engine 420, actual controller 440, and annunciation device 450 are coupled. In an embodiment, system 400 is a manufacturing plant and communication network 460 is a plant Ethernet I/P network. Communication network may be realized as other types of communications including, but not limited, to a wireless network.

In an embodiment, system 400 is a manufacturing plant having a plant Ethernet IP communication network 460, where process model 410 includes virtual programmable logic controller (VPLC) models and is hosted on a computer along with appropriate data. The computer may be realized as a commerically available personal computer (PC). The PC is coupled to Plant Ethernet I/P 460. The VPLC models represent initial design intent, which includes such items as cycle times, activity sequencing, and actual process assumptions.

Using an identification tag for process control, VPLC 410 monitors and uses actual output signals from actual controller 440 on the plant floor. The identification tag may be an OLE for process control (OPC) tag, where OLE is object linking and embedding. Actual controller 440 may be a programmable logic controller, PLC. On receiving output signals from PLC 440, VPLC 410 starts its processes. VPLC models run in "shadow mode", only sending input states to its input image table.

Difference engine 420 reads the input image table from PLC 440 and compares it against the state of the input image table from VPLC model 410. As parallel processes occur for process model 410 and actual process 430, difference engine 420 determines if significant changes are occurring, for single or multiple items. For example, difference engine 420 may detect a delta between an actual clamp close time from PLC 440 and designed close time in model 410. Then, after analysis by difference engine 420, annunciation device 450 may direct a diagnostic message(s) to PLC 440 on plant floor.

Such a diagnostic apparatus and methods incorporated in system 400 provides for continuous improvement using lessons learned. For example, if initial design assumptions were incorrect, then the model and model data for plant 400 may be adjusted. This architecture for system 400 provides the plant 400 with better diagnostics and provides a better model for next build in the virtual manufacturing engineering process.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. It is to be understood that the above description is intended to be illustrative, and not restrictive, and that the phraseology or terminology employed herein is for the purpose of description and not of limitation. Combinations of the above embodiments, and other embodiments, will be apparent to those of skill in the art upon studying the above description. The scope of the present invention includes any other applications in which the above structures and fabrication methods are used. The scope of the present invention should be determined with reference to the appended claims, along with the full scope of equivalents to which such claims are entitled.

What is claimed is:

1. A method comprising:

acquiring output from a process model, the process model having elements reused from a design process, the elements providing a known good state, the process model corresponding to an actual process of an actual system, the actual process regulated by a managing controller;

obtaining output information generated from the actual process;

determining a difference between the process model and the actual process, using the output information and the output from the process model; and applying the determined difference arranged to diagnose the actual system including diagnosing a problem in the actual process from determining the difference, wherein initial input states to the actual process are used providing initial input states to the process model, the initial input states to the process model representing essentially the same initial input states as the initial input states to the actual process with the process model operating as the actual process operates.

2. The method of claim 1, wherein obtaining output information includes obtaining a current status of elements operating in the actual process.

3. The method of claim 1, wherein acquiring output includes acquiring an expected current status of elements operating in the actual process.

4. The method of claim 1, wherein determining a difference between the process model and the actual process includes comparing the output from the process model with the output information.

5. The method of claim 1, wherein determining a difference between the process model and the actual process includes comparing an input image table from the actual process with an input image table from the process model, both input image tables correlated to common initial input states.

6. The method of claim 1, wherein the method further includes providing the process model with process logic verified in the design process as the elements reused from the design process.

7. The method of claim 1, wherein obtaining output information generated from an actual process includes obtaining the output information from one or more controllers.

8. The method of claim 1, wherein the method further includes scanning element input states into the process model at a scan rate.

9. The method of claim 1, wherein the method further includes scanning element input states into the process model at a rate such that aperiodic events are captured.

10. The method of claim 1, wherein the method further includes announcing the difference between the process model and the actual process.

11. The method of claim 1, wherein the method further includes logging information associated with the difference between the process model and the actual process.

12. The method of claim 1, wherein the method further includes analyzing the difference between the process model and the actual process.

13. The method of claim 1, wherein the method further includes reinitiating the design process based on analyzing the difference between the process model and the actual process to evolve the process model.

14. The method of claim 1, wherein providing a process model includes integrating logic from a plurality of design processes.

15. The method of claim 1, wherein the method includes:

monitoring, using a virtual programmable logic controller of the process model, outputs from the managing controller;

sending, using the virtual programmable logic controller, input states to an input image table for the process model based on the monitoring; and comparing, using a difference engine, an input image table corresponding to the managing controller against the input image table for the process model for determining the difference between the process model and the actual process.

16. The method of claim 1, wherein the method includes monitoring the managing controller, by a virtual programmable logic controller of the process model, using an identification tag for process control.

17. The method of claim 16, wherein using an identification tag for process control includes using an object linking and embedding tag.

18. The method of claim 1, wherein the method includes the process model generating all inputs to itself after the initial input states are provided to the process model.

19. A computer-readable medium having computer-executable instructions for performing a method comprising:

acquiring output from a process model, the process model having elements reused from a design process, the elements providing a known good state, the process model corresponding to an actual process of an actual system, the actual process regulated by a managing controller;

obtaining output information of the actual process;

determining a difference between the process model and the actual process, using the output information and the output from the process model; and applying the determined difference arranged to diagnose the actual system including diagnosing a problem in the actual process from determining the difference, wherein initial input states to the actual process are used providing initial input states to the process model, the initial input states to the process model representing essentially the same initial input states as the initial input states to the actual process with the process model operating as the actual process operates.

20. The computer-readable medium of claim 19, wherein the output information of the actual process includes a current status of elements operating in the actual process and the output from the process model includes an expected current status of elements operating in the actual process.

21. The computer-readable medium of claim 19, wherein the method further includes scanning element input states into the process model at a scan rate.

22. The computer-readable medium of claim 19, the method further includes scanning element input states into the process model at a rate such that aperiodic events are captured.

23. The computer-readable medium of claim 19, wherein the method further includes announcing the difference between the process model and the actual process.

24. The computer-readable medium of claim 19, wherein the method further includes logging information associated with the difference between the process model and the actual process.

25. The computer-readable medium of claim 19, wherein the method further includes analyzing the difference between the process model and the actual process.

26. The computer-readable medium of claim 19, wherein the method further includes reinitiating the design process based on analyzing the difference between the process model and the actual process.

27. The computer-readable medium of claim 19, wherein determining a difference between the process model and the actual process includes comparing an input image table from the actual process with an input image table from the process model, both input image tables correlated to common initial input states.

28. The computer-readable medium of claim 19, wherein the process model includes logic integrated from a plurality of design processes.

29. The computer-readable medium of claim 19, wherein the instructions include:
   monitoring, using a virtual programmable logic controller of the process model, outputs from the managing controller;
   sending, using the virtual programmable logic controller, input states to an input image table for the process model based on the monitoring; and
   comparing, using a difference engine, an input image table corresponding to the managing controller against the input image table for the process model for determining the difference between the process model and the actual process.

30. The computer-readable medium of claim 19, wherein the instructions include monitoring the managing controller, by a virtual programmable logic controller of the process model, using an identification tag for process control.

31. The computer-readable medium of claim 30, wherein using an identification tag for process control includes using an object linking and embedding tag.

32. An apparatus comprising:
   a process model adapted to virtually perform logical tasks based on elements reused from a design process and to provide outputs, the elements structured to provide a known good state, the process model corresponding to an actual process of an actual system;
   a difference engine to compare the outputs from the process model with output information correlated to the actual process; and
   an evaluation unit configured to diagnose the actual process from the comparison of the outputs from the process model with the output information correlated to an actual process such that a difference determined from the comparison is applied to diagnose a problem in the actual system, wherein initial input states to the actual process are used providing initial input states to the process model, the initial input states to the process model representing essentially the same initial input states as the initial input states to the actual process with the process model operating as the actual process operates.

33. The apparatus of claim 32, wherein the output information correlated to the actual process includes a current status of elements operating in the actual process and the outputs from the process model include an expected current status of elements operating in the actual process.

34. The apparatus of claim 32, wherein at least a portion of the output information correlated to an actual process is provided from a controller that manages a portion of the actual process.

35. The apparatus of claim 32, wherein the process model includes hardware logic to provide the outputs in response to determining expected element input states.

36. The apparatus of claim 32, wherein the process model includes software to provide the outputs in response to determining expected element input states.

37. The apparatus of claim 32, wherein the apparatus includes an annunciator to signal an occurrence of the difference between the process model and the actual process.

38. The apparatus of claim 32, wherein the apparatus includes a log to collect information associated with the difference between the process model and the actual process.

39. The apparatus of claim 32, wherein the apparatus includes an analysis unit having historical information regarding the actual process.

40. The apparatus of claim 32, wherein the process model includes a plurality of component process models in a one-to-one relationship with a plurality of controllers that manage the actual process, the plurality of component process models adapted to diagnose the actual process as an integration of a plurality of component actual processes.

41. The apparatus of claim 32, wherein the process model includes a virtual programmable logic controller arranged to monitor outputs from a managing controller of the actual process and to send input states to an input image table for the process model such that the difference engine operatively compares an input image table corresponding to the managing controller against the input image table for the process model.

42. The apparatus of claim 32, the process model includes a virtual programmable logic controller arranged to monitor outputs from a managing controller of the actual process such that the monitoring uses an identification tag for process control.

43. The apparatus of claim 42, wherein the identification tag for process control includes an object linking and embedding tag.

44. A system comprising:
   a process model adapted to virtually perform logical tasks based on elements reused from a design process and to provide outputs, the elements structured to provide a known good state, the process model corresponding to an actual process of an actual system;
   a controller adapted to regulate tasks of the actual process, the controller configured to provide output information correlated to the actual process;
   a difference engine to compare the outputs from the process model with output information from the controller to determine a difference between the process model and an actual process; and
   an evaluation unit configured to diagnose the actual process from the determined difference between the process model and an actual process such that the determined difference is applied to diagnose a problem in the actual system, wherein the controller is configured to provide initial input states to the actual process and corresponding initial input states to the process model, the initial input states to the process model representing essentially the same initial input states as the initial input states to the actual process with the process model operating as the actual process operates.

45. The system of claim 44, wherein the output information correlated to the actual process includes a current status of elements operating in the actual process and the outputs from the process model include an expected current status of elements operating in the actual process.

46. The system of claim 44, wherein the system includes an annunciator to signal an occurrence of the difference between the process model and the actual process.

47. The system of claim 44, wherein the system includes a log to collect information associated with the difference between the process model and the actual process.

48. The system of claim 44, wherein the system includes an analysis unit having historical information regarding the actual process.

49. The system of claim 44, wherein the process model includes a plurality of component process models in a one-to-one relationship with a plurality of controllers that manage the actual process, the plurality of component process models adapted to diagnose the actual process as an integration of a plurality of component actual processes.

50. The system of claim 44, wherein the system is a manufacturing plant having a number of manufacturing lines.

51. The system of claim 44, wherein the process model includes a virtual programmable logic controller arranged to monitor outputs from the controller and to send input states to an input image table for the process model such that the difference engine compares an input image table corresponding to the controller against the input image table for the process model for comparing the outputs from the process model with output information correlated to the actual process.

52. The system of claim 44, the process model includes a virtual programmable logic controller arranged to monitor outputs from the controller such that the monitoring uses an identification tag for process control.

53. The system of claim 52, wherein the identification tag for process control includes an object linking and embedding tag.

* * * * *